A. DE KHOTINSKY.
ELECTRICALLY HEATED INCUBATOR.
APPLICATION FILED MAY 23, 1916.

1,381,109.

Patented June 14, 1921.
2 SHEETS—SHEET 1.

Inventor
Achilles de Khotinsky
Attorney.

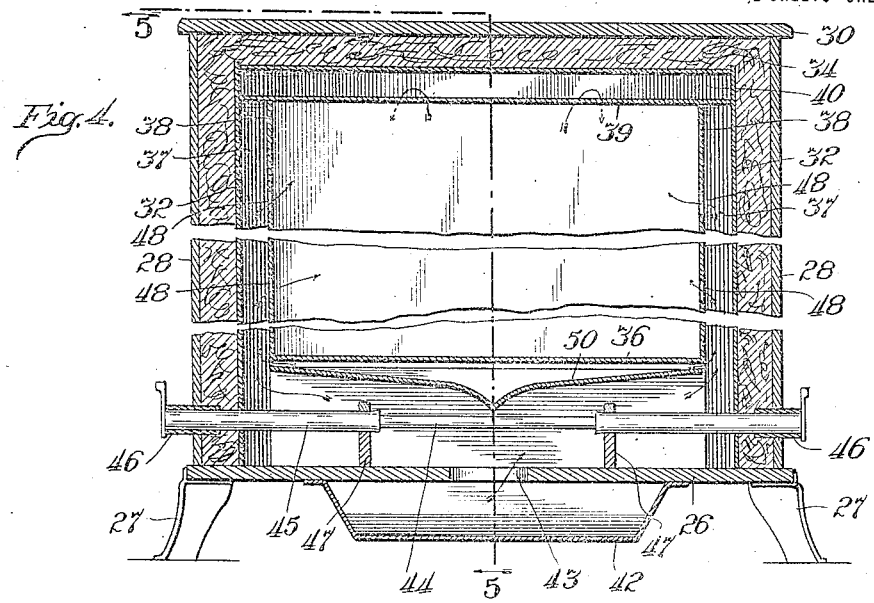
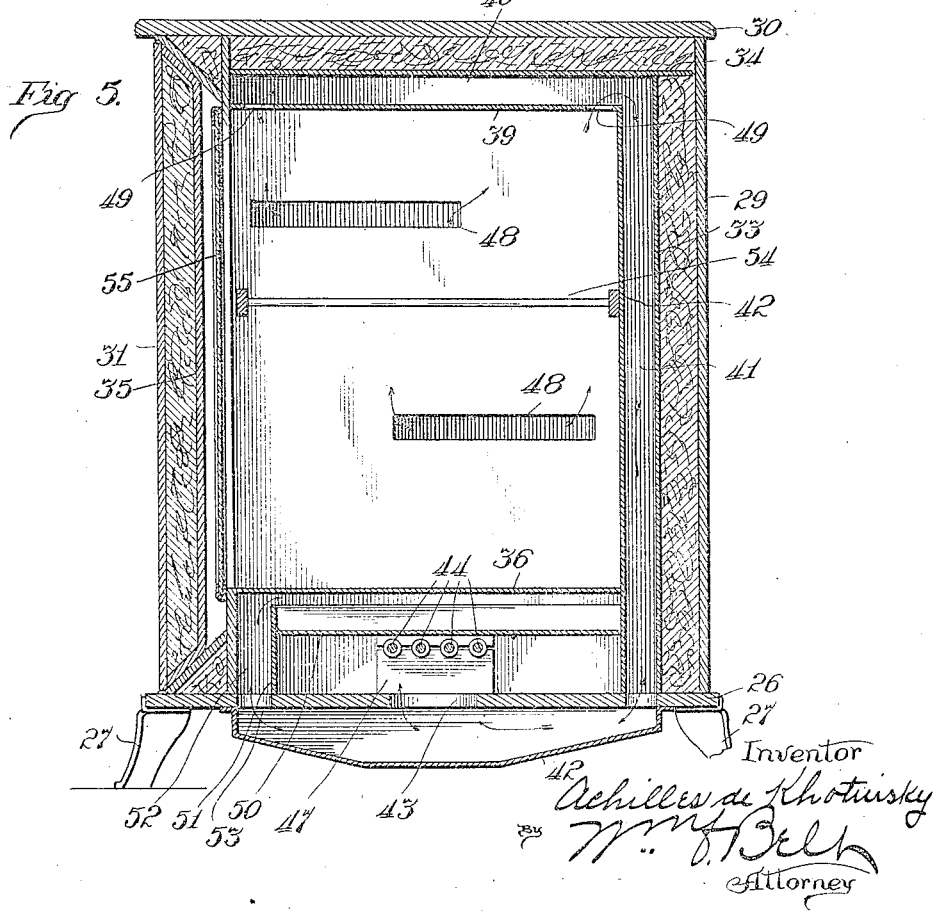

UNITED STATES PATENT OFFICE.

ACHILLES DE KHOTINSKY, OF CHICAGO, ILLINOIS, ASSIGNOR TO CENTRAL SCIENTIFIC COMPANY, OF CHICAGO, ILLINOIS, A CORPORATION OF ILLINOIS.

ELECTRICALLY-HEATED INCUBATOR.

1,381,109.  Specification of Letters Patent.  Patented June 14, 1921.

Application filed May 23, 1918. Serial No. 236,084.

*To all whom it may concern:*

Be it known that I, ACHILLES DE KHOTINSKY, a citizen of the United States, residing at Chicago, in the county of Cook and State of Illinois, have invented certain new and useful Improvements in Electrically-Heated Incubators, of which the following is a specification.

I have heretofore constructed incubators for use in conducting experimental work in laboratories and particularly in pursuing the study of bacteriology in which the temperature is maintained by the circulation of air, warmed by electrically heated elements, through the heating chamber. The heating elements were disposed beneath the floor of the heating chamber and suitable flues were provided to conduct the air to and from the heating elements. I have discovered that the proximity of the heating elements to the floor of the heating chamber resulted in the radiation of heat through the floor to an extent which raised the temperature in the lower portion of the heating chamber above the point intended to be maintained therein. Inasmuch as an apparatus of this character must be compactly arranged with the heating elements in position to permit a natural circulation of the air it became necessary to overcome the effect of direct radiation.

It is the object therefore of my invention to provide an incubator having electrically heated elements arranged therein to permit a natural circulation of air between the heating chamber and the heating elements and to utilize a portion of the air current to prevent direct radiation of heat through the floor above the heating elements so that the temperature of the heating chamber is maintained at a uniform pre-determined point.

Further objects and advantages of my invention reside in the various combinations hereinafter described as will be apparent as it is better understood by reference to the following specification when read in connection with the accompanying drawing illustrating the preferred embodiments thereof, in which—

Fig. 4 is a longitudinal section through a slightly different form of incubator or oven embodying my invention; and Fig. 5 is a section on the line 5—5 of Fig. 4.

Figure 1:
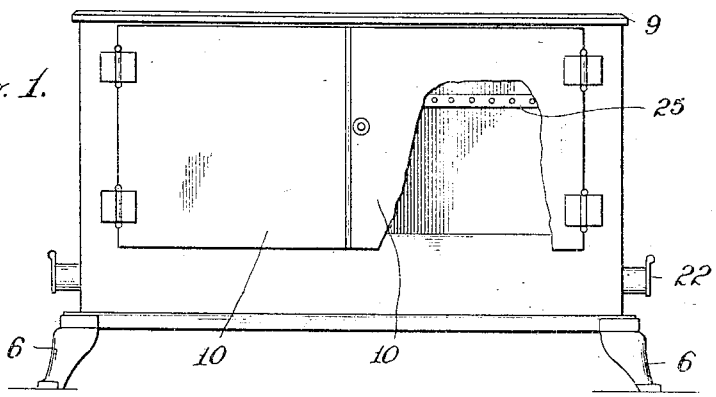
Figure 1 is a front elevation of an incubator or oven embodying my invention, parts being broken away for better illustration.
Figure 2:
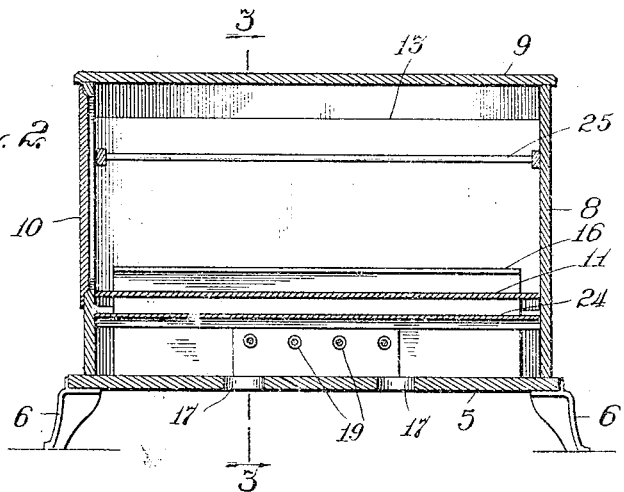
Fig. 2 is a transverse section through the incubator or oven.
Figure 3:
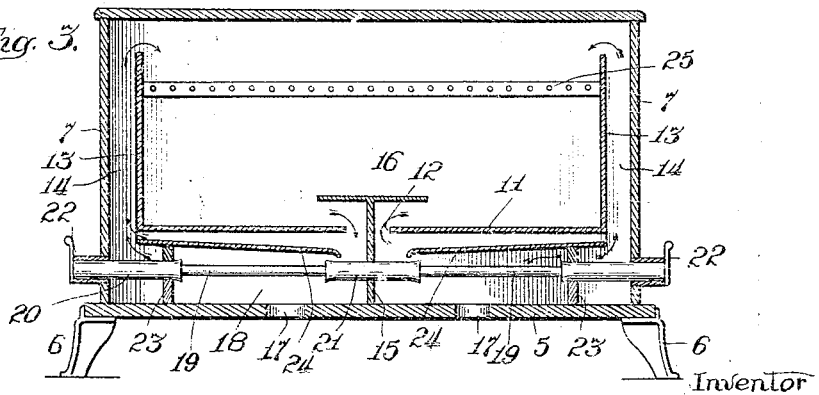
Fig. 3 is a section on the line 3—3 of Fig. 2.

In Figs. 1 to 3 of the drawing I have illustrated the application of my invention to a single wall incubator or oven. The oven comprises a base 5 preferably mounted on legs 6 and supporting a body consisting of end walls 7, the rear wall 8, a top 9 and hinged doors 10.

A false floor 11 is supported in spaced relation with the base 5 and is provided with a transversely extending opening 12. Partitions 13 spaced from the end walls 7 form therewith flues 14 which communicate with the space between the base 5 and false floor 11. A dividing wall 15 is mounted on the base 5 and extends upwardly through the opening 12 in the false floor 11 supporting at its top a baffle 16 arranged above the opening 12. Openings 17 in the base 5 permit air to enter the heating compartment 18 above the base 5.

A plurality of heating elements 19 are disposed within the heating compartment. These heating elements are preferably substantially identical with those described in my patent No. 1,208,756 granted December 19, 1916 and are mounted in tubes 20 and 21, the former being supported by insulating blocks 22 in the end walls 7 and upright members 23 within the heating compartment and the latter being supported by the dividing wall 15. The heating elements 19 are connected in any suitable manner to a source of current which may be controlled through means well known in the art to regulate the temperature of the air which circulates in the oven.

To prevent radiation from the heating elements through the false floor 11 I provide baffles 24 between the false floor and the heating elements and extending across the air heating compartment as clearly indicated in Fig. 3. The edges of the baffles 24 are spaced from the dividing wall 15 adjacent the opening 12 in the false floor 11 so that the descending current of air passing through the opening 12 may enter the air heating compartment. This current of air after passing about the heating elements 19 is delivered to the flues 14 and passes over the upper edges of the partitions 13 into the heating chamber, thence it again passes downwardly through the opening 12. A portion of the descending current of air is deflected into the auxiliary passages or compartments between the false floor 11 and the baffles 24. This portion of air current absorbs the heat radiating from the heating elements 19 and cools the false floor 11. After passing through the auxiliary passages or compartments, the air mingles with the heated air in the flues 14. By reason of the construction described, a natural circulation of air through the auxiliary passages or compartments is constantly maintained, thus protecting the false floor 11 from direct radiation, so that the lower portion of the heating chamber may be maintained at a temperature corresponding to that of the rest of the chamber. The course of the air currents is indicated by the arrows in Fig. 3.

Obviously one or more shelves or trays 25 may be conveniently arranged within the heating chamber and various minor changes may be made in the form and arrangement of the oven without departing from the invention.

In Figs. 4 and 5 I have illustrated the application of my invention to a triple walled oven. In this form of my invention 26 indicates a base preferably mounted on legs 27 and supporting a rectangular casing consisting of end walls 28, a rear wall 29, a top 30 and an outer door 31. Inner walls 32, 33 and 34 are spaced from the end walls 28, rear wall 29, and top 30 to provide compartments adapted to receive a suitable insulating material. The door 31 is similarly provided with an inner wall 35 forming a space to receive insulating material.

A false floor 36 is supported in spaced relation with the base 26 forming therewith a heating compartment which communicates at its ends with flues 37 formed between partition walls 38 and the inner end walls 32. A false top 39 provides a flue 40 which communicates at the rear of the oven with a flue 41 between a partition 41' and the inner rear wall 33. The flue 41 communicates at its bottom with a pan 42 secured beneath the base 26. An opening 43 in the base 26 permits air in the pan 42 to rise into the heating compartment.

Heating elements 44 which may be identical with those previously referred to are supported in tubes 45 mounted in insulating blocks 46 in the end walls 28 and in upright members 47, within the heating compartment. The heating elements 44 are connected to any suitable source of current which may be controlled by any usual means to regulate the temperature of the air, which circulates within the oven.

The partitions 38 are provided with rectangular openings 48 arranged one above the other, and preferably staggered as indicated in Fig. 5 to permit the air rising in the flues 37 to pass into the heating chamber. The false top 39 is similarly provided with openings 49 to permit egress of the air from the heating chamber into the flue 40 and thence into the flue 41.

To prevent radiation from the heating elements to the false floor 36 I provide a baffle 50 preferably arranged as indicated in Fig. 4 between the heating elements and the false floor 36 providing an auxiliary air passage or compartment. At the front of the air heating compartment a partition 51 provides a flue 52 which communicates through an opening 53 in the base 26 with the pan 42. At its upper end the flue 52 communicates with the auxiliary air passage or compartment between the baffle 50 and the false floor 36. The baffle 50 is spaced from the false floor 36 at its ends to permit air to pass therefrom into the flues 37.

The circulation of the air will be readily understood from the following brief description. Heated air is delivered from the flues 37 through the openings 48 to the heating chamber, and thence passes through the openings 49 into the flue 40. The air passes downwardly in the flue 41 to the pan 42. The bulk of this air current is drawn upwardly through the opening 43 in the base 26 and passes about the heating elements 44 and thence into flues 37 completing the circuit. A portion of the air current is deflected from the pan 42 through the flue 52 into the auxiliary air passage or compartment between the baffle 50 and the false floor 36 and is heated by radiation from the heating elements 44, at the same time protecting the false floor 36 from this radiation. The air from the auxiliary passage or compartment passes into and mingles with the air in the flues 37. The current of air through the auxiliary passage or compartment permits the maintenance of a temperature near the false floor 36 within the heating chamber substantially equivalent to the temperature of other portions of the heating chamber.

One or more shelves or trays 54 may be supported within the heating chamber and I preferably provide an inner glass door 55 through which the contents of the heating chamber may be observed without subjecting such contents to exposure to the atmosphere. Obviously the exact construction and arrangement of the baffle forming the auxiliary passage or compartment is not limited to use in the particular incubator or oven described, and in fact may be applied to other forms of heating apparatus in which means providing a circulation of heated air is an essential part. My invention resides in the discovery of means whereby the temperature may be made more uniform through the provision of radiation of heat through the floor of the heating compartment, and without loss of any of the heat.

From the foregoing it will be apparent that I have perfected the means and apparatus of the character described for accomplishing the desired result in a satisfactory and efficient manner and that various changes may be made in the form construction and arrangement of the parts, without departing from the spirit or scope of the invention or sacrificing any of its material advantages, the forms hereinbefore described being merely the preferred embodiment thereof.

I claim:

1. In a heating apparatus, the combination of a heating chamber having a floor, an air heating compartment beneath said floor, heating means in said compartment, flues at the ends of said chamber and compartment and communicating therewith to permit circulation of air therebetween, a flue at the top of said chamber communicating therewith, a flue at the back of the chamber and compartment communicating with said top flue, a pan secured to the floor on the under side thereof and providing an air space beneath the floor communicating with said back flue, and a flue at the front of said compartment communicating therewith and with an air space between the pan and the floor, there being an opening in the floor forming a communication between the compartment and the air space below the floor.

2. In a heating apparatus, the combination of a heating chamber having a floor, an air heating compartment beneath said floor, heating means in said compartment, flues at the ends and back of said chamber communicating therewith and with said compartment to permit circulation of air therebetween, a baffle in said compartment between said heating means and floor forming an auxiliary compartment communicating with said flues independently of said air heating compartment and forming a passage for air currents to absorb the heat radiating from said heating means thereby protecting said floor therefrom.

3. In a heating apparatus, the combination of a heating chamber having a floor, an air heating compartment beneath said floor, heating means in said compartment, flues at the ends of said chamber communicating therewith, a flue at the back of said chamber communicating therewith adjacent the top thereof, said flues being arranged respectively to withdraw air from and deliver it to said compartment, and a baffle in said compartment between said heating means and floor forming an auxiliary compartment communicating with said flues independently of said air heating compartment and adapted to permit circulation of relatively cool air from the flue at the rear of said chamber to the flues at the ends thereof.

ACHILLES DE KHOTINSKY.

Witness:
Z. COBB.